Aug. 2, 1955    W. W. PRICKETT ET AL    2,714,439
CAN POSITIONING MACHINE
Filed May 20, 1954    4 Sheets-Sheet 1
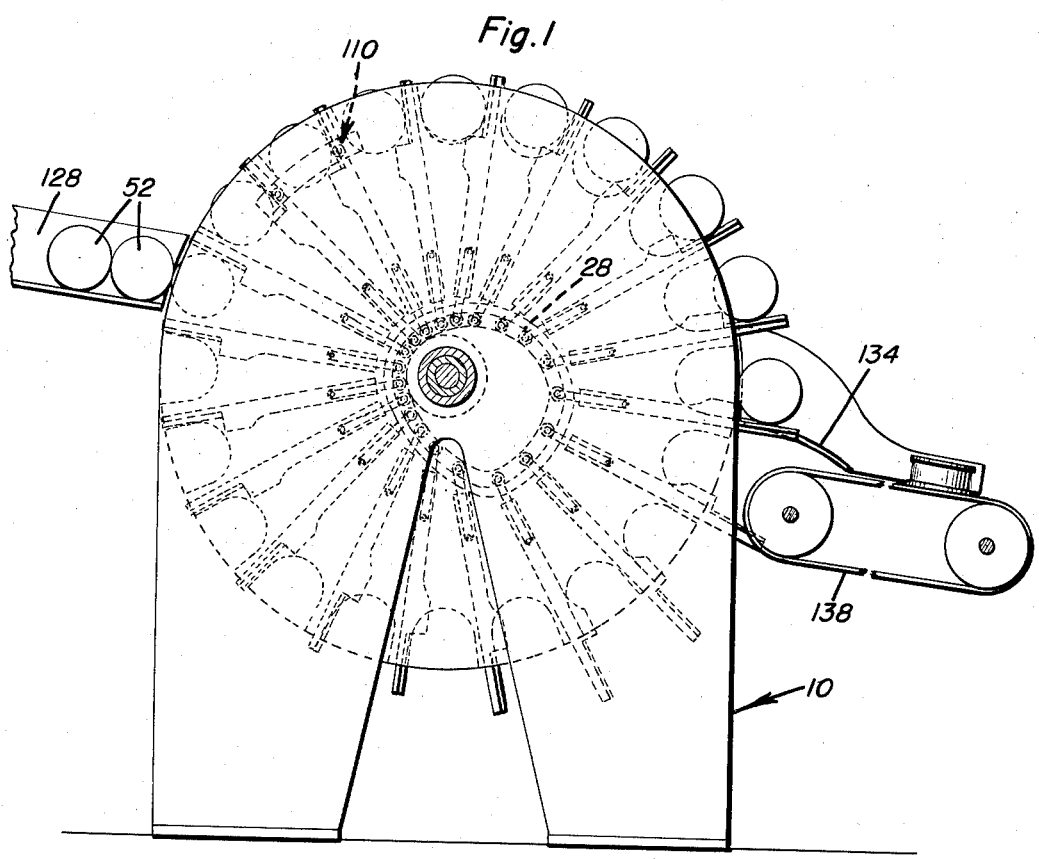
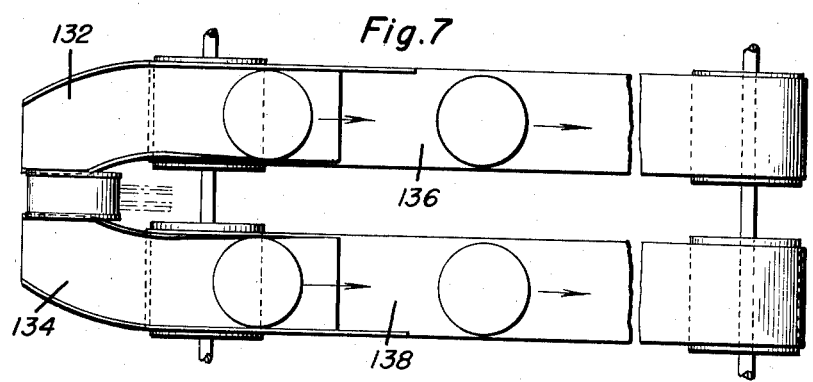
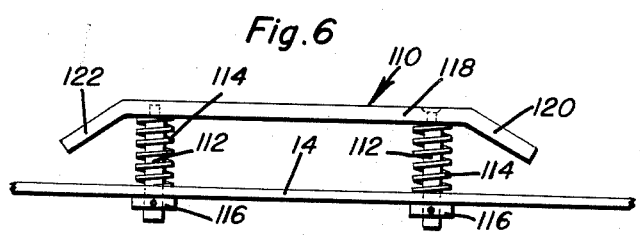
Wilber W. Prickett
Mona E. Prickett
INVENTORS

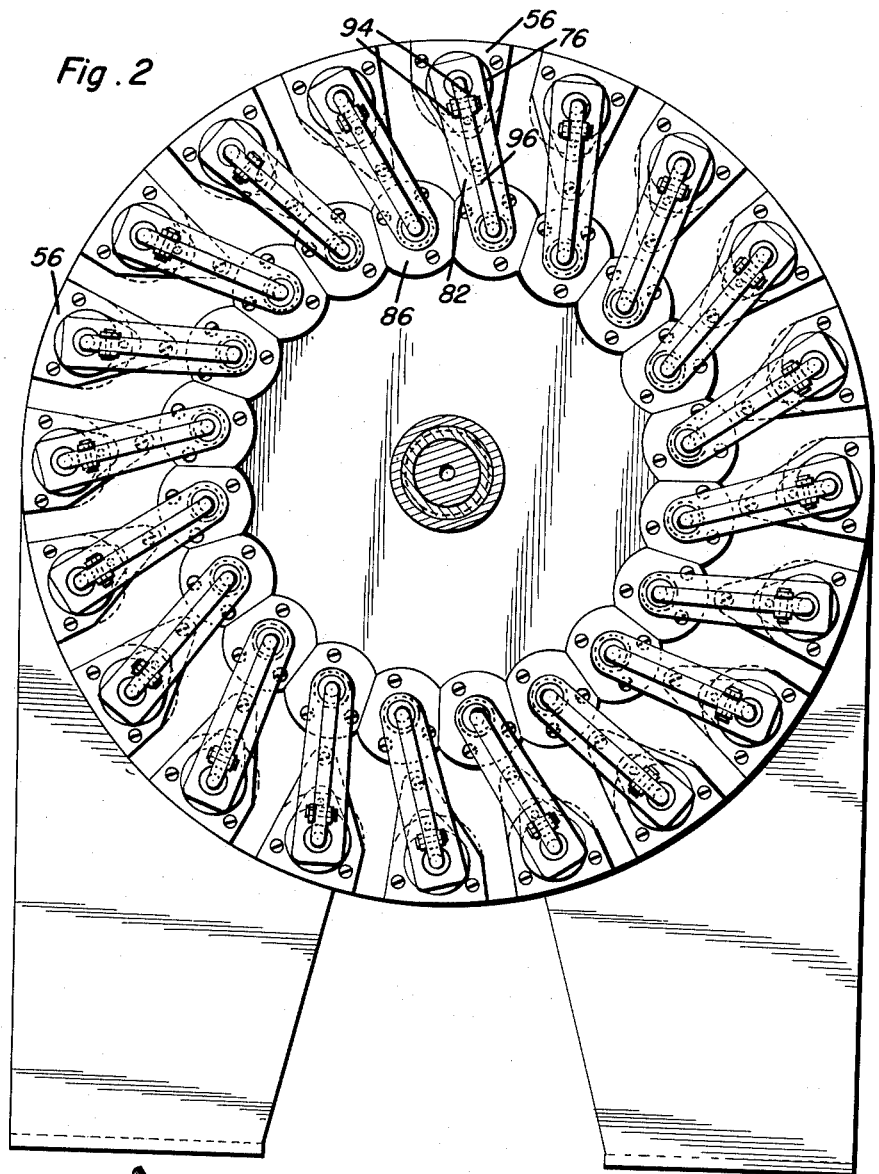
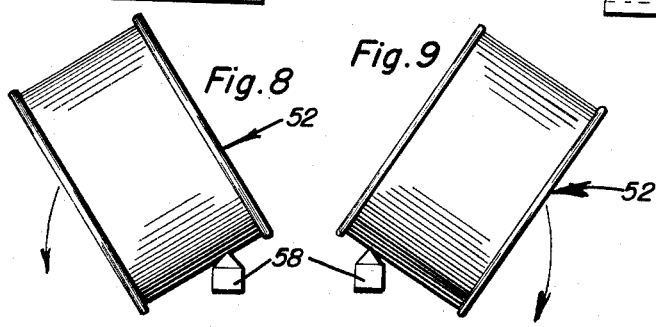

Aug. 2, 1955

W. W. PRICKETT ET AL 2,714,439

CAN POSITIONING MACHINE

Filed May 20, 1954

Wilber W. Prickett
Mona E. Prickett
INVENTORS

BY *Clarence A. O'Brien*
*and Harvey B. Jacobson*
Attorneys

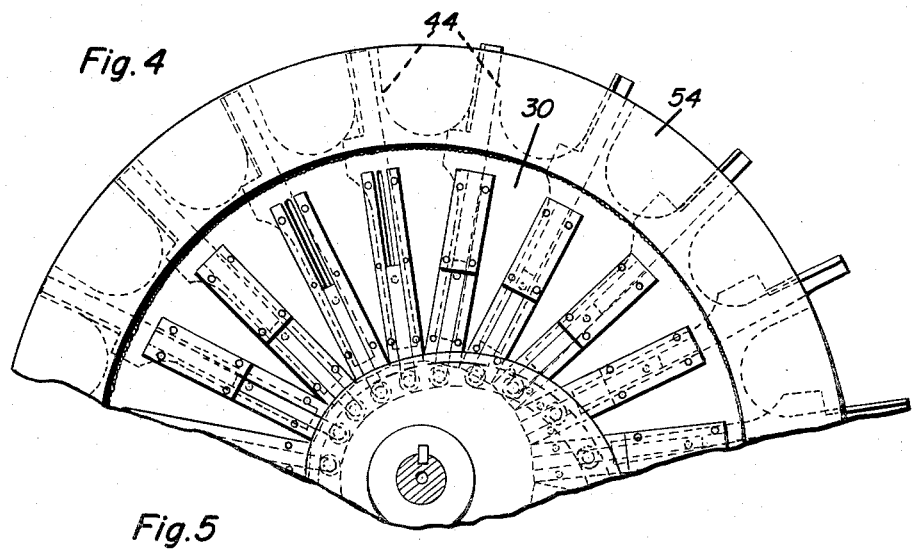
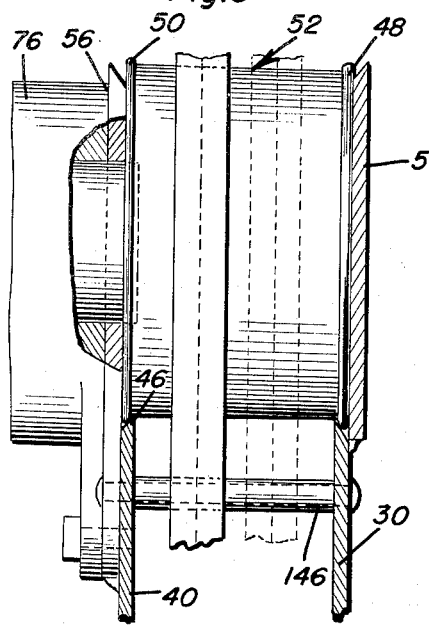
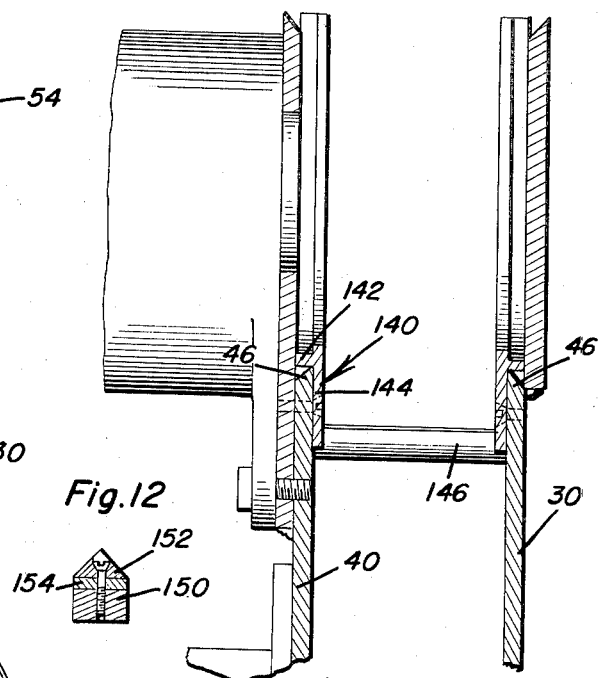
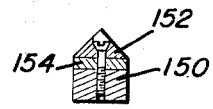
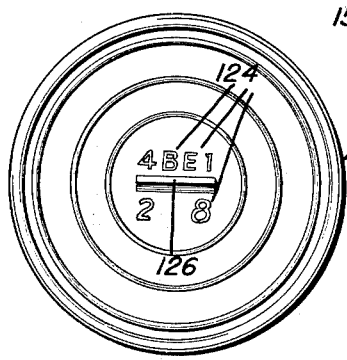
Wilber W. Prickett
Mona E. Prickett
INVENTORS ়
United States Patent Office 2,714,439
Patented Aug. 2, 1955

2,714,439

CAN POSITIONING MACHINE

Wilber W. Prickett and Mona E. Prickett,
San Diego, Calif.

Application May 20, 1954, Serial No. 431,076

20 Claims. (Cl. 198—31)

This invention relates generally to canning apparatus and pertains more particularly to a machine for properly positioning cans prior to a labeling operation to be performed thereon.

A primary object of this invention is to provide a machine to position cans such that the ends of the same which are provided with the usual serial number will be positioned to face upwardly so that a labeling operation to be subsequently performed will be uniform.

These, together with other objects and advantages which will become subsequently apparent reside in the details of construction and operation as more fully hereinafter described and claimed, reference being had to the accompanying drawings forming a part hereon, wherein like numerals refer to like parts throughout, and in which:

Figure 1 is a side elevational view of a machine constructed in accordance with this invention;

Figure 2 is a sectional view of the machine;

Figure 4 is a view showing a portion of the conveyor in elevation;

Figure 5 is an enlarged transverse section showing the portion of the indexing apparatus;

Figure 6 is an elevational view showing one of the can mechanisms;

Figure 7 is a plan view of the discharge chute and associated discharge conveyors;

Figures 8 and 9 are elevational views showing the cans in the process of being discharged;

Figure 10 is a view similar to Figure 5 but showing insert mechanisms in place for adapting the machine for use with smaller sized cans as is shown in Figure 5;

Figure 12 is a transverse sectional view through one of the selector features.

Figure 13 is a plan view of a can of the type processed by the positioning machine.

Figures 3, 11:
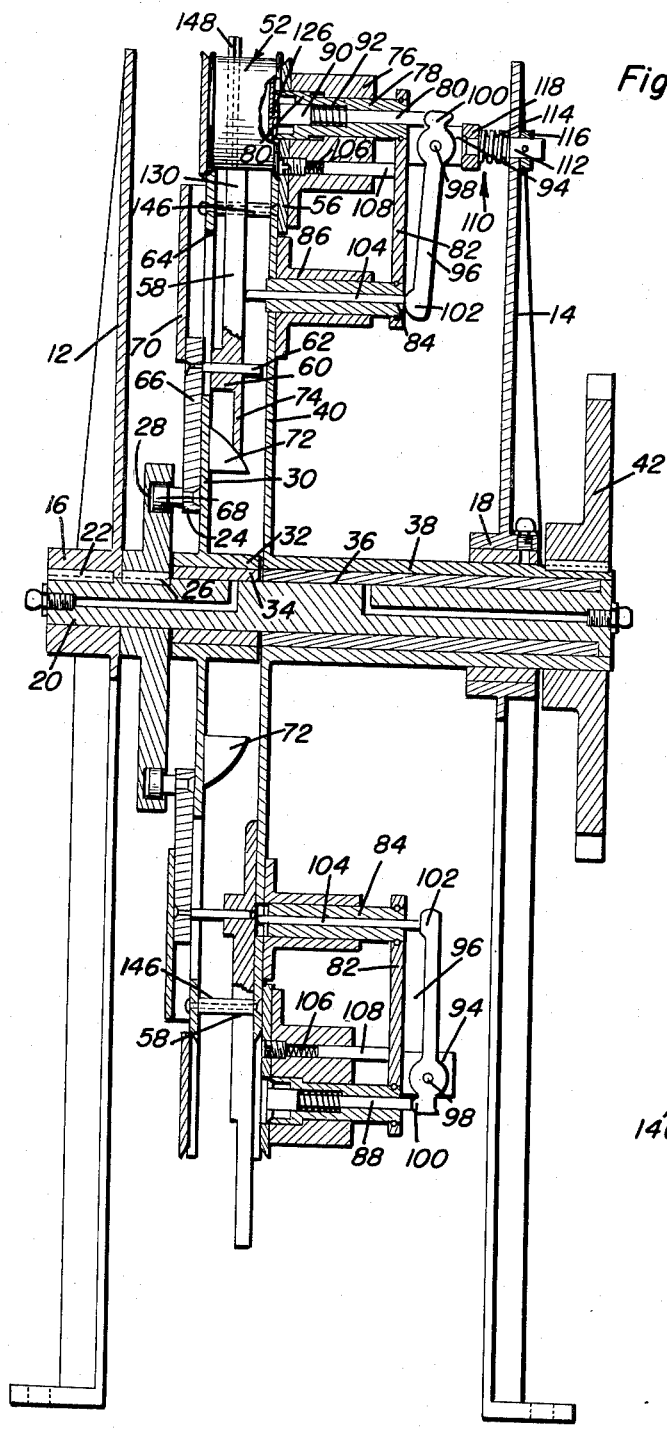
Figure 3 is a transverse sectional view of the machine showing the details of its internal construction.
Figure 11 is a plan view of one of the insert mechanisms.

Referring now more particularly to the drawings, the base of the machine is indicated generally by the reference character 10 and will be seen to consist of a pair of standard or vertical uprights 12 and 14, each of which has a central hub 16 and 18 provided with a line of bores therethrough to receive a support shaft 20 therebetween, the support shaft being seated as by member 22 to one of the hubs to secure the same against rotation. This shaft has a cam plate 24 rigidly secured thereto as by a key member 26, the cam plate being provided with a a cam groove 28 therein. Adjacent the cam plate is a disk member 30 forming a portion of the conveyor mechanism of the machine and it is to be noted that this disk is provided with a central hub portion 32 provided with a bushing 34 journalling the same on the shaft 20. Also rotatably supported on the shaft 20 by a bushing 36 is the hub portion 38 of a second disk member 40 spaced from the aforementioned disk 30. The hub 38 extends outwardly beyond the standard 14 and has a sprocket member 42 suitably feathered thereon and adapted for connection to a suitable source of power for rotating the conveyor assembly.

As will be seen most clearly in Figures 4 and 5, the peripheries of the disks are provided with cutaway portions 44 provided with beveled edges 46 to meet with the rims 48 and can bodies of the can assemblies 52 in the manner shown. One disk 30 is provided with an annular retainer plate 54 to hold the cans properly in place within the pockets formed by the cutaways 44 and the other disk member 40 is provided with a plurality of individual plate members 56 covering the cutaway portions.

A plurality of radially positioned selector fingers or arms 58 are secured between the disks for imparting movement radially of the disks and laterally between the same inasmuch as the prong portions 60 adjacent the inner ends of the arms or fingers slidably receive the spoke members 62 for lateral movement between the plates whereas the spoke members are screwable within elongated slots 64 in the disks 30. The spokes or pins 62 are carried by the followers 66 having the roller members 68 extending laterally from and journalled at one end thereof for reception within the previously mentioned cam groove 28. The followers are constrained to radial movement with respect to the disk 30 by virtue of their reception within guide members 70 on the disk. In this manner, it will be readily apparent that reciprocation of the followers 66 as effected by the cam plate 24 will impart reciprocatory motion to the arms or fingers 58. At this point, it is to be noted that a cam element 72 is associated with each of the arm or finger members and that the latter are provided with inner end extensions 74 engageable with the cam elements such that when the fingers reach their innermost position, they will be shifted laterally on the spoke 62 to a position adjacent the disk 40, see the lower portion of Figure 3.

The mechanism for effecting lateral shifting of the arm members consists of a bearing block or housing 76 mounted on each of the plate members 56 which slidably carries the sleeve 78 provided with an enlarged inner end 80 to limit outward movement of the sleeve and which is connected through a bridge piece 82 to a further sleeve member 84 slidably received within a bearing member 86 positioned radially inwardly from the associated housing 70. An indexing plunger 88 is slidably received in sleeve 78 and is provided with an enlarged inner end portion 90 projectable through an opening in plate 56 for engagement with an associated can 52. A spring 92 normally urges the indexing plunger to an extended position with respect to the sleeve 78.

The bridge piece 82 carries a pair of spaced bracket members 94 which journal an indexing crank 96 therebetween on the pin member 98 such that one end 100 of the indexing crank is engaged by the outer end of the plunger 88 and the opposite end 102 of the indexing crank overlies and engages with a plunger 104 carried by the sleeve 84 and having an inner end engageable with a cross forming one of the selector fingers 58. A spring 106 and associated plunger 108 normally engage the bridge piece 82 and urge the same to the position shown in the lower portion of Figure 3.

A cam strap illustrated generally by the reference character 110 as shown in Figures 1 and 6 is secured to the standard 14 in the path of movement of the free ends of the brackets 94 and is yieldingly mounted to the standard by means of the pin 112 projecting therethrough, the concentric spring 114 and the stop collars 116. The strap proper 118 is provided with ramp portions 120 and 122 to prevent shock during the canning operation and the purpose of this can strap is to shift the bridge piece 82 towards the disk 40 as the brackets 94 pass over the strap so that the proper indexing of the arm 58 will be effected in response to the position of an associated can 52 as will be presently apparent.

In this respect, reference is had more particularly to Figure 13 which shows the end of a conventional can assembly 52, the view showing the top end thereof which is provided with the usual serial numbers 124 and is additionally provided for the purpose of carrying forth the operation of the herein described machine, an upraised ridge 126. During operation of the machine, it will be apparent that cans 52 placed in the machine through the medium of the gravity input chute 128 are randomly disposed in that there is no system in the manner in which the top and bottom ends face. Thus, the can will be positioned between the disk members 30 and 40 either in the position shown in Figure 3 wherein the ridge 126 faces the disk 40 or oppositely wherein the ridge 126 will face the disk 30. In the former case, as is shown in Figure 3, as the brackets 94 pass over the cam straps 118, the plunger 88 will be engaged against the ridge 126 and will not be projected inwardly with respect to the bridge piece 82 as far as it would be were not the ridge so positioned. Consequently, the opposite end 102 of the selector arm crank 96 will be swung inwardly to shift the corresponding arm or finger 58 to a position to fall forth from the engagement with the plate 30 and the plate 40.

Subsequently, the finger will be projected radially outwardly from between the disk members under action of the cam plate 24 and the enlarged portion 130 of the finger will move the can with it so that the sole support for the can will be the finger which, because it is positioned nearer the bottom of the can than the top thereof, will permit the can to fall onto one of the discharge chutes 132 or 134 with its top face downward to slide by gravity to one of the conveyor discharge members 136 or 138.

For the purpose of utilizing the machine for different sized cans, insert members indicated generally by the reference character 140 may be provided, one of the inserts being shown in Figure 11. The inserts are positioned as shown in Figure 10 such that their offset flange portions 142 projecting laterally from their main plate portions 144 engage over the beveled upper edges 146 of the disk members 40 and 30.

Since the outer ends of the fingers 58 rest upon and are supported in part by the cross rods 146 to assure that the knife edge of the outer extremities 148 of the fingers engage against the side of an associated can when the insert members 140 are in place, the fingers are constructed in accordance with the showing of the Figure 11 wherein the main body portion 148 thereof is rigid with the remainder of the finger and the knife edged portion 152 is separable therefrom so that the shim 154 may be inserted therebetween to assure the aforementioned engagement with the can.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A can positioning machine comprising a base, an endless conveyor mounted on said base, said conveyor including spaced, vertical side members and a series of spaced fingers disposed between said side members whereby the periphery of said conveyor is divided into a plurality of can receiving pockets said fingers being laterally shiftable between said side members, means for shifting said fingers between a position adjacent one side of the conveyor and a position adjacent the other side of the conveyor in response to the orientation of a can received in each one of the pockets, means for projecting the fingers and associated cans from between the side members as the fingers approach a horizontal position whereby the associated cans will fall to one side of the conveyor dependent upon the positioning of the fingers therebeneath, and means positioned adjacent said conveyor to receive discharged cans.

2. A can positioning machine comprising a base, an endless conveyor mounted on said base, said conveyor including spaced, vertical side members and a series of spaced fingers disposed between said side members whereby the periphery of said conveyor is divided into a plurality of can receiving pockets, said fingers being laterally shiftable between said side members, means for placing cans within the pockets of said conveyor such that the tops and bottoms of the cans face opposite side members, means for shifting each finger toward that side member adjacent the top of one associated can, means for projecting the fingers and associated cans from between the side members as the fingers approach a horizontal position whereby the associated cans will fall to one side of the conveyor dependent upon the positioning of the fingers therebeneath, and means positioned adjacent said conveyor to receive discharged cans.

3. A can positioning machine comprising a base, a pair of spaced vertical disk members mounted for rotation on said base, a plurality of radial fingers disposed between said disk members adapted to receive cans therebetween, means for placing cans between adjacent pairs of said fingers, such that the tops of the cans are parallel to said disk members, means for shifting each finger away from that disk member to which the top of one associated can is adjacent, means for moving said fingers and the associated can radially outwardly from between said disk members as the fingers approach a horizontal position whereby the associated cans will fall to one side dependent upon the positioning of the fingers immediately therewith, and means positioned adjacent said disk members to receive discharged cans.

4. The combination of claim 1 wherein means are provided for shifting said fingers to an initial position subsequent to discharge of the associated cans.

5. The combination of claim 2 wherein means are provided for shifting said fingers to an initial position subsequent to discharge of the associated cans.

6. The combination of claim 3 wherein means are provided for shifting said fingers to an initial position subsequent to discharge of the associated cans.

7. A can positioning machine comprising a base, an endless conveyor mounted on said base, said conveyor including spaced, vertical side members and a series of spaced fingers disposed between said side members whereby the periphery of said conveyor is divided into a plurality of can receiving pockets, said fingers being laterally shiftable between said side members, a plurality of cans disposed within said pockets, each of said cans having an outwardly deformed ridge adjacent the center of one of its ends, a plunger associated with each of said pockets and movable toward and away from one end of the can disposed therein, means connecting said plungers and said fingers to position the latter to one side of the conveyor when the plunger engages said ridge and to the other side of the conveyor when the plunger engages that end of the can not provided with a ridge, means for projecting the fingers and associated cans from between the side members as the fingers approach a horizontal position whereby the associated cans will fall to one side of the conveyor dependent upon the positioning of the fingers therebeneath, and means positioned adjacent said conveyor to receive discharged cans.

8. A can positioning machine comprising a base, an endless conveyor mounted on said base, said conveyor including spaced, vertical side members and a series of spaced fingers disposed between said side members whereby the periphery of said conveyor is divided into a plurality of can receiving pockets, said fingers being laterally shiftable between said side members, means for placing cans within the pockets of said conveyor such that the tops and bottoms of the cans face opposite side members, each of said cans having an outwardly deformed ridge adjacent the center of one of its ends, a plunger associated with each of said pockets and movable toward and away from one end of the can disposed therein, means connecting said plungers and said fingers to position the latter to one side of the conveyor when the plunger engages said ridge and to the other side of the conveyor when the plunger engages that end of the can not provided with a ridge, means for moving said fingers and the associated can radially outwardly from between said disk members as the fingers approach a horizontal position whereby the associated cans will fall to one side dependent upon the positioning of the fingers immediately therewith, and means positioned adjacent said disk members to receive discharged cans.

9. A can positioning machine comprising a base, a pair of spaced vertical disk members mounted for rotation on said base, a plurality of radial fingers disposed between said disk members adapted to receive cans therebetween, means for placing cans between adjacent pairs of said fingers, such that the tops of the cans are parallel to said disk members, each of said cans having an outwardly deformed ridge adjacent the center of one of its ends, a plunger associated with each of said pockets and movable toward and away from one end of the can disposed therein, means connecting said plungers and said fingers to position the latter to one side of the conveyor when the plunger engages said ridge and to the other side of the conveyor when the plunger engages that end of the can not provided with a ridge, means for moving said fingers and the associated can radially outwardly from between said disk members as the fingers approach a horizontal position whereby the associated cans will fall to one side dependent upon the positioning of the fingers immediately therewith, and a pair of discharge chutes positioned on opposite sides of said disk members to receive discharged cans.

10. The machine as defined in claim 7 and means for shifting said fingers to one initial position subsequent to discharge of the associated cans.

11. The machine as defined in claim 8 and means for shifting said fingers to one initial position subsequent to discharge of the associated cans.

12. The machine as defined in claim 9, and means for shifting said fingers to one initial position subsequent to discharge of the associated cans.

13. A can positioning machine comprising a base, an endless conveyor mounted on said base, said conveyor including spaced, vertical side members and a series of spaced fingers disposed between said side members whereby the periphery of said conveyor is divided into a plurality of can receiving pockets, said fingers being laterally shiftable between said side members, means for shifting said fingers between a position adjacent one side of the conveyor and a position adjacent the other side of the conveyor in response to the orientation of a can received in each one of the pockets, means for moving said fingers inwardly and outwardly from between the side members in response to movement of the conveyor such that the fingers are projected outwardly as they approach a horizontal position, whereby the associated cans will fall to one side of the conveyor dependent upon the positioning of the fingers therebeneath, means positioned adjacent the conveyor to receive discharged cans and means responsive to withdrawal of the fingers from the projected position for shifting the fingers to an initial position subsequent to discharge of the associated cans.

14. A can positioning machine comprising a base, an endless conveyor mounted on said base, said conveyor including spaced, vertical side members and a series of spaced fingers disposed between said side members whereby the periphery of said conveyor is divided into a plurality of can receiving pockets, said fingers being laterally shiftable between said side members, means for placing cans within the pockets of said conveyor such that the tops and bottoms of the cans face opposite side members, means for shifting each finger away from that side member adjacent the top of one associated can, means for moving said fingers inwardly and outwardly from between the side members in response to movement of the conveyor such that the fingers are projected outwardly as they approach a horizontal position, whereby the associated cans will fall to one side of the conveyor dependent upon the positioning of the fingers therebeneath, means positioned adjacent the conveyor to receive discharged cans, and means responsive to withdrawal of the fingers from the projected position for shifting the fingers to an initial position subsequent to discharge of the associated cans.

15. A can positioning machine comprising a base, a pair of spaced vertical disk members mounted for rotation on said base, a plurality of radial fingers disposed between said disk members adapted to receive cans therebetween, means for placing cans between adjacent pairs of said fingers, such that the tops of the cans are parallel to said disk members, means for shifting each finger away from that disk member to which the top of one associated can is adjacent, means for moving said fingers inwardly and outwardly from between the side members in response to movement of the conveyor such that the fingers are projected outwardly as they approach a horizontal position, whereby the associated cans will fall to one side of the conveyor dependent upon the positioning of the fingers therebeneath, means positioned adjacent the conveyor to receive discharged cans, and means responsive to withdrawal of the fingers from the projected position for shifting the fingers to an initial position subsequent to discharge of the associated cans.

16. A can positioning machine comprising a base, an endless conveyor mounted on said base, said conveyor including spaced, vertical side members and a series of spaced fingers disposed between said side members whereby the periphery of said conveyor is divided into a plurality of can receiving pockets, said fingers being laterally shiftable between said side members, a plurality of cans disposed within said pockets, each of said cans having an outwardly deformed ridge adjacent the center of one of its ends, a plunger associated with each of said pockets and movable toward and away from one end of the can disposed therein, means connecting said plungers and said fingers to position the latter to one side of the conveyor where the plunger engages said ridge and to the other side of the conveyor when the plunger engages that end of the can not provided with a ridge, means for projecting the fingers and associated cans from between the side members as the fingers approach a horizontal position whereby the associated cans will fall to one side of the conveyor dependent upon the positioning of the fingers therebeneath, and a pair of discharge chutes positioned at opposite sides of said conveyor to receive discharged cans.

17. A can positioning machine comprising a base, an endless conveyor mounted on said base, said conveyor including spaced, vertical side members and a series of spaced fingers disposed between said side members whereby the periphery of said conveyor is divided into a plurality of can receiving pockets, said fingers being laterally shiftable between said side members, means for placing cans within the pockets of said conveyor such that the tops and bottoms of the cans face opposite side members, a plurality of cans disposed within said pockets, each of said cans having an outwardly deformed ridge adjacent the center of one of its ends, a plunger associated with each of said pockets and movable toward and away from one end of the can disposed therein, means connecting said plungers and said fingers to position the latter to one side of the conveyor when the plungers engage the can ridges and to the other side of the conveyor when the plungers engage that end of the cans not provided with a ridge, means for moving said fingers inwardly and outwardly from between the side members in response to movement of the conveyor such that the fingers are projected outwardly as they approach a horizontal position, whereby the associated cans will fall to one side of the conveyor dependent upon the positioning of the fingers therebeneath, a pair of discharge chutes positioned at opposite sides of the conveyor to receive discharged cans, and means responsive to withdrawal of the fingers from the projected position for shifting the fingers to an initial position subsequent to discharge of the associated cans.

18. A can positioning machine comprising a base, a pair of spaced vertical disk members mounted for rotation on said base, a plurality of radial fingers disposed between said disk members adapted to receive cans therebetween, means for placing cans between adjacent pairs of said fingers, such that the tops of the cans are parallel to said disk members, each of said cans having an outwardly deformed ridge adjacent the center of one of its ends, a plunger associated with each of said pockets and movable toward and away from one end of the can disposed therein, means connecting said plungers and said fingers to position the latter to one side of the conveyor when each plunger engages a can ridge and to the other side of the conveyor when each plunger engages that end of the can not provided with a ridge, means for moving said fingers inwardly and outwardly from between the side members in response to movement of the conveyor such that the fingers are projected outwardly as they approach a horizontal position, whereby the associated cans will fall to one side of the conveyor dependent upon the positioning of the fingers therebeneath, a pair of discharge chutes positioned at opposite sides of the conveyor to receive discharged cans, and means responsive to withdrawal of the fingers from the projected position for shifting the fingers to an initial position subsequent to discharge of the associated cans.

19. A machine for orienting containers, said machine comprising a base, a conveyor carried by said base including spaced, side members forming at least one can receiving pocket therebetween, and a finger between said side members, said finger being laterally shiftable between said side members, means for shifting said finger between a position adjacent one side of the conveyor and a position adjacent the other side of the conveyor in response to the orientation of a container received in said pocket, means for projecting the finger and an associated container from between the side members during a portion of the movement of the conveyor whereby the container will fall to one side of the conveyor dependent upon the positioning of the finger relative to the side members.

20. A machine for orienting containers each having one end wall thereof provided with an outwardly projecting ridge, a container orienting conveyor carried by said machine including spaced side members forming a container receiving pocket therebetween, a finger carried by said machine and being laterally shiftably disposed between said side members, means for shifting said finger between a position adjacent one side of the conveyor and a position adjacent the opposite side of the conveyor in response to the orientation of the ridged end of a container received in said pocket, and means for projecting the finger and an associated container from between the side members during a portion of the movement of the conveyor whereby the container will fall to one side of the conveyor dependent upon the positioning of the finger relative to the side members.

References Cited in the file of this patent

UNITED STATES PATENTS 2,329,312    Weeks _____ Sept. 14, 1943